(12) United States Patent
Tseng et al.

(10) Patent No.: US 11,528,768 B2
(45) Date of Patent: Dec. 13, 2022

(54) METHOD OF SIDELINK RADIO LINK FAILURE CONTROL AND RELATED DEVICE

(71) Applicant: FG Innovation Company Limited, Tuen Mun (HK)

(72) Inventors: Yung-Lan Tseng, Taipei (TW); Hung-Chen Chen, Taipei (TW); Mei-Ju Shih, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 115 days.

(21) Appl. No.: 17/091,602

(22) Filed: Nov. 6, 2020

(65) Prior Publication Data

US 2021/0136856 A1    May 6, 2021

Related U.S. Application Data

(60) Provisional application No. 62/931,396, filed on Nov. 6, 2019.

(51) Int. Cl.
*H04W 76/19* (2018.01)
*H04W 76/14* (2018.01)
*H04W 92/18* (2009.01)

(52) U.S. Cl.
CPC .......... *H04W 76/19* (2018.02); *H04W 76/14* (2018.02); *H04W 92/18* (2013.01)

(58) Field of Classification Search
CPC .... H04L 1/1825; H04W 76/14; H04W 76/19; H04W 76/28; H04W 92/18
See application file for complete search history.

(56) References Cited

U.S. PATENT DOCUMENTS

2022/0191962 A1* 6/2022 Di Girolamo ...... H04W 36/305

FOREIGN PATENT DOCUMENTS

CN      113661775 A * 11/2021 ........... H04L 1/1812

* cited by examiner

*Primary Examiner* — Thomas R Cairns
(74) *Attorney, Agent, or Firm* — ScienBiziP, P.C.

(57) ABSTRACT

A method of sidelink (SL) radio link failure (RLF) control for a first user equipment (UE) and a second UE is disclosed. The method comprises obtaining at least one SL RLF configuration, wherein the SL RLF configuration is associated with at least one SL radio bearer within at least one PC5 RRC connection and includes at least one SL RLF control parameter indicating at least one transmission range for SL communication, selecting, by the first UE, at least one SL RLF control parameter of the SL RLF configuration associated with the PC5 RRC connection, according to a communication distance between the first UE and the second UE and the at least one transmission range indicated by the at least one SL RLF control parameter, and determining, by the first UE, an SL RLF event occurs on the PC5 RRC connection based on the selected SL RLF control parameter.

16 Claims, 6 Drawing Sheets

METHOD OF SIDELINK RADIO LINK FAILURE CONTROL AND RELATED DEVICE

CROSS-REFERENCE TO RELATED APPLICATION(S)

The present disclosure claims the benefit of and priority to U.S. provisional Patent Application Ser. No. 62/931,396 filed on Nov. 6, 2019, entitled "Sidelink Radio Link Failure Configuration Mechanisms," (hereinafter referred to as "the '396 provisional"). The disclosure of the '396 provisional is hereby incorporated fully by reference into the present disclosure.

FIELD

The present disclosure generally relates to wireless communications, and more particularly, to a method of sidelink (SL) radio link failure (RLF) control and a related device.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of sidelink (SL) radio link failure (RLF) control and a related device.

According to an aspect of the present disclosure, a method of SL RLF control for a first user equipment (UE) and a second UE is disclosed. The method comprises obtaining at least one SL RLF configuration, wherein the SL RLF configuration is associated with at least one SL radio bearer within at least one PC5 RRC connection established between the first UE and the second UE and includes at least one SL RLF control parameter indicating at least one transmission range for SL communication, selecting, by the first UE, at least one SL RLF control parameter of the SL RLF configuration associated with the at least one PC5 RRC connection, according to a communication distance between the first UE and the second UE and the at least one transmission range indicated by the at least one SL RLF control parameter, and determining, by the first UE, an SL RLF event occurs on the at least one PC5 RRC connection based on the selected SL RLF control parameter.

According to another aspect of the present disclosure, a UE for performing SL RLF control is provided. The UE comprises a processor, for executing computer-executable instructions, and a non-transitory computer-readable medium, coupled to the processor, for storing the computer-executable instructions, wherein the computer-executable instructions instruct the processor to perform the method.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DESCRIPTION

Figure 1:
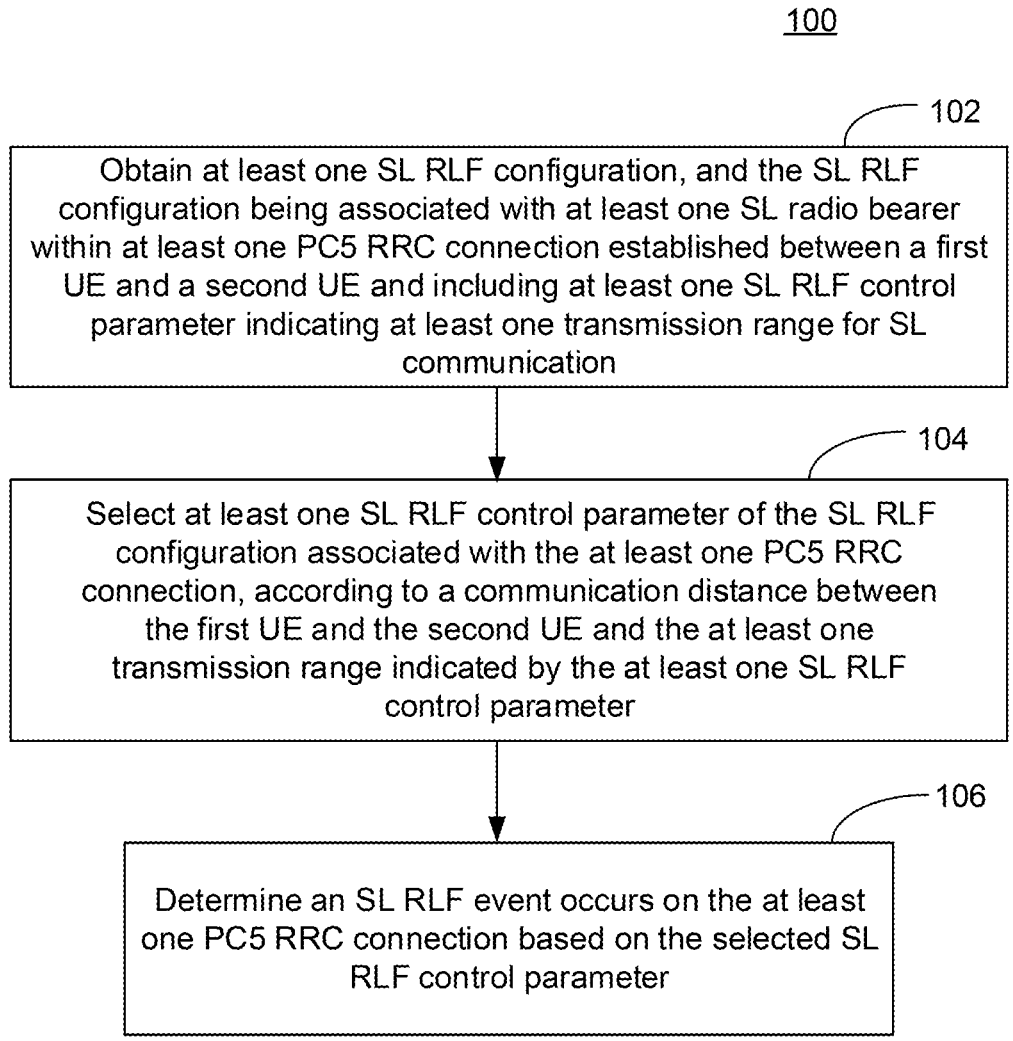
FIG. 1 is a flowchart illustrating a method for sidelink (SL) radio link failure (RLF) control, according to an implementation of the present disclosure.

The following description contains specific information pertaining to exemplary implementations in the present disclosure. The drawings and their accompanying detailed description are directed to exemplary implementations. However, the present disclosure is not limited to these exemplary implementations. Other variations and implementations of the present disclosure will occur to those skilled in the art. Unless noted otherwise, like or corresponding elements in the figures may be indicated by like or corresponding reference numerals. Moreover, the drawings and illustrations are generally not to scale and are not intended to correspond to actual relative dimensions.

For consistency and ease of understanding, like features are identified (although, in some examples, not shown) by numerals in the exemplary figures. However, the features in different implementations may be different in other respects, and therefore shall not be narrowly confined to what is shown in the figures.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. Besides, the character "|" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behaviors, terms, or claims in the present disclosure may be implemented independently and separately to form a specific method. Dependency, e.g., "based on", "more specifically", "preferably", "In one embodiment", "In one implementation", "In one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include but may not be limited to Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or an NR system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

It should be noted that, in the present disclosure, a UE may include, but is not limited to, a mobile station, a mobile terminal or device, a user communication radio terminal. For example, a UE may be a portable radio equipment, that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR) (often referred to as 5G), and/or LTE-A Pro. However, the scope of the present disclosure should not be limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage, (e.g., each cell schedules the DL and optionally UL resources to at least one UE within its radio coverage for DL and optionally UL packet transmissions). The BS may communicate with one or more UEs in the radio communication system via the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells.

In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary Secondary Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising of the SpCell and optionally one or more SCells.

As discussed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC)

code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided via an NR frame to support ProSe services or V2X services.

One PC5-S connection may be associated with one (e.g., one-to-one mapped) or more PC5 RRC connection(s) and different V2X service may have different requirements to the service interruption time (because of SL radio link failure (RLF)). Thus, different SL RLF configurations may be provided to different PC5-S connections, which are associated with different kinds of V2X services. In addition, the SL RLF configurations may depend on many factors, such as the SL carrier aggregation, frequency range, the distance between the UEs in the SL-unicast group. It is noted that the SL RLF configurations may not be limited by RRC states that include the RRC Connected state, RRC Inactive state, and RRC Idle state of the UEs in the SL-unicast group. In addition, the SL RLF configurations may also be applicable to both NR PC5 interface and LTE PC5 interface.

FIG. 1 is a flowchart illustrating a method 100 for SL RLF control, according to an implementation of the present disclosure. In action 102, the first UE may obtain at least one SL RLF configuration. The SL RLF configuration is associated with at least one SL radio bearer within at least one PC5 RRC connection established between the first UE and the second UE and includes at least one SL RLF control parameter indicating at least one transmission range for SL communication. In action 104, the first UE may select at least one SL RLF control parameter of the SL RLF configuration associated with the PC5 RRC connection, according to a communication distance between the first UE and the second UE and the at least one transmission range indicated by the at least one SL RLF control parameter. In action 106, the first UE may determine an SL RLF event that occurs on the PC5 RRC connection based on the selected SL RLF control parameter.

Based on the method 100 in FIG. 1, the SL RLF configuration for at least one PC5 RRC connection includes at least one SL RLF control parameter indicating at least one transmission range is configured to the UE, and the SL RLF control parameter is selected according to the communication distance between the first UE and the second UE. Thus, the UE may determine whether an SL RLF event occurs on the PC5 RRC connection based on the selected SL RLF control parameter.

In one implementation, the SL RLF configuration is obtained through a pre-installed SL pre-configuration, from a serving cell through the (LTE/NR) Uu interface, or from a third UE (e.g., the second UE or other paired UE) through the PC5 interface.

In one implementation, the SL RLF configuration further includes the maximum number of SL packet re-transmission threshold associated with the transmission range. Therefore, the first UE may select the maximum number of SL packet re-transmission threshold associated with the PC5 RRC connection according to the communication distance between the first UE and the second UE, and may determine the SL RLF event occurs on the PC5 RRC connection when the number of SL packet re-transmissions associated with the at least one SL radio bearer within the corresponding PC5 RRC connection is reached to or above, namely being equal to or greater than, the selected maximum number of SL packet re-transmission threshold.

In one example, the maximum number of SL packet re-transmission thresholds is an SL packet re-transmission threshold for Automatic Repeat-reQuest (ARQ) mechanism in a Radio Link Control (RLC) entity associated with at least one SL radio bearers within the corresponding PC5 RRC connection.

In one implementation, after the first UE determines an SL RLF event occurs, the UE may report an SL RLF report to the serving cell of the first UE with a UE identifier corresponding to the second UE.

In one implementation, after the first UE determines an SL RLF event occurs, the first UE may report an SL RLF report to the second UE through at least one PC5 RRC connection (e.g., through PC-5 RRC signaling exchange) between the first UE and a third UE (e.g., the second UE).

In one implementation, the first UE may estimate the distance with the second UE according to sidelink control information (SCI) received from the second UE. In some implementations (e.g., two stages SCI transmission), the first UE may estimate the distance with the second UE according the $1^{st}$-stage SCI received from the second UE. In some other implementations, the first UE may estimate the distance with the second UE according the $2^{nd}$-stage SCI received from the second UE.

Moreover, SL RLF configuration (e.g., timers and associated parameters) in the PC5 RRC connection is disclosed as follows. It is noted that the SL RLF configuration may be transmitted through different cast-types (e.g., SL-unicast, SL multi-cast or SL group-cast), which is not limited herein.

Implementation 1: SL RLF for PC5 RRC Connection

Figure 2:
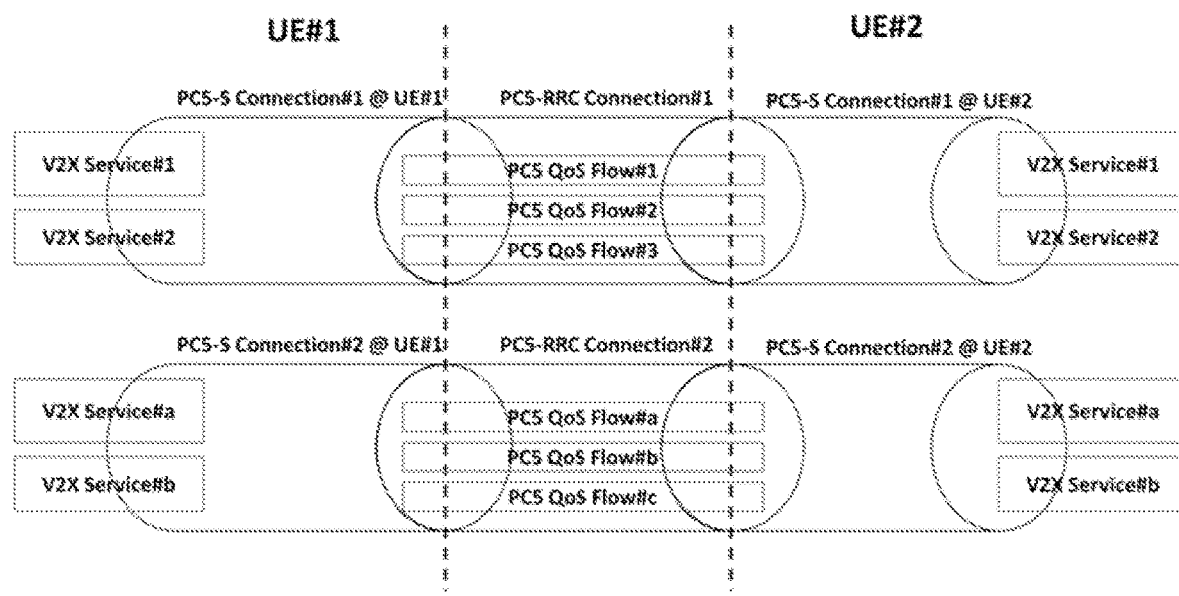
FIG. 2 is a schematic diagram illustrating PC5-S connection(s) and associated PC5-RRC connection(s) between a pair of UEs, according to an implementation of the present disclosure.

FIG. 2 is a schematic diagram illustrating a PC5-S connection between a pair of UEs, according to an implementation of the present disclosure. As illustrated in FIG. 2, Two UEs (e.g., UE #1 and UE #2) may establish one or more PC5 RRC connections (e.g., PC5-RRC Connection #1 and PC5-RRC Connection #2), and each PC5 RRC connection (e.g., PC5-RRC Connection #1 or PC5-RRC Connection #2) may support different set of V2X services with different QoS requirements (e.g., PC5 QoS Flow #1-PC5 QoS Flow #3, and PC5 QoS Flow #a-PC5 QoS Flow #c) respectively.

First, a PC5 RRC connection may be different from an RRC connection in the (LTE/NR) Uu interface. In the PC5 interface, one SL-unicast group (e.g., UE #1 and UE #2 in FIG. 2) may first need to build (at least) one PC5-S connection and each PC5-S connection (e.g., PC5-S Connection #1 or PC5-S Connection #2) may be associated one PC5 RRC connection (e.g., PC5-RRC Connection #1 or PC5-RRC Connection #2) in the Access Stratum (AS) layer independently. In other words, the PC5-S connection and PC5 RRC connection may be one-to-one mapping. Each PC5 RRC connection is a logical connection (e.g., a logical connection at the AS layer) between a pair of source and destination IDs (e.g., Layer-2/Layer-1 IDs). At service level, one PC5-S connection and the associated PC5 RRC connection may be built to serve one or more V2X services. For example, the PC5-S Connection #1 at the UE #1 and UE #2 are established to serve V2X service #1 and V2X service #2, and the PC5-S Connection #2 are established to serve V2X service #a and V2X service #b. It is noted that there may be multiple active PC5-S connections/PC5 RRC connections in the paired UEs to support different sets of V2X services that have different QoS requirements. In some implementations, the UE may report the status of the one or more PC5 RRC connections to the serving cell (e.g., PCell in an MCG or PSCell in an SCG), and thus the serving cell may know the conditions of the PC5 RRC connections in the UE. In addition, the UE may also report the SL RLF event (corresponding to at least one PC5 RRC connection) to the serving cell (e.g., for the reason of SL resource management). It is noted that one UE may join multiple SL-unicast groups with different target UEs, so one UE may have PC5 RRC connections that are associated with different UEs. Therefore, one or more SL RLF reports may be associated with different Layer-2 IDs when the UE transmits the SL RLF reports (e.g., to the serving cell).

For SL RLF reporting, a new timer (e.g., similar to the T310 in NR Uu interface) is specified in NR SL RLF operation, and the timer is applied for the PC5 interface. Operation of the T310 in the Uu interface is disclosed.

In the (LTE/NR) Uu interface, the UE may start the T310 when the UE detects physical (PHY) layer related problems (e.g., when the UE receives N310 consecutive out-of-sync indications from a lower layer, such as the PHY layer) with the serving special cells that includes the Primary Cell (PCell) in an MCG or Secondary Cell (PSCell) in an SCG. In other words, one UE may maintain different T310 timers for MCG and SCG respectively.

The UE may stop T310 in the following conditions:

a) UE receiving N311 consecutive in-sync indications from the PHY layer.

b) the UE triggering the HANDOVER procedure (e.g., upon the UE receives RRC Reconfiguration with an Information Element (IE) (e.g., "reconfigurationwithsync" or "mobilitycontrolinfoV2X").

c) initiating the CONNECTION RE-ESTABLISHMENT procedure.

d) SCG releasing, the T310 kept in SCG.

After the T310 expires, the UE may move to RRC Idle state (if the security in the (LTE/NR) Uu interface between the UE and serving cell is not yet established successfully before) or the UE may initiate the RRC Connection Re-establishment procedure (if the security in the Uu interface is established successfully before).

Figure 3:
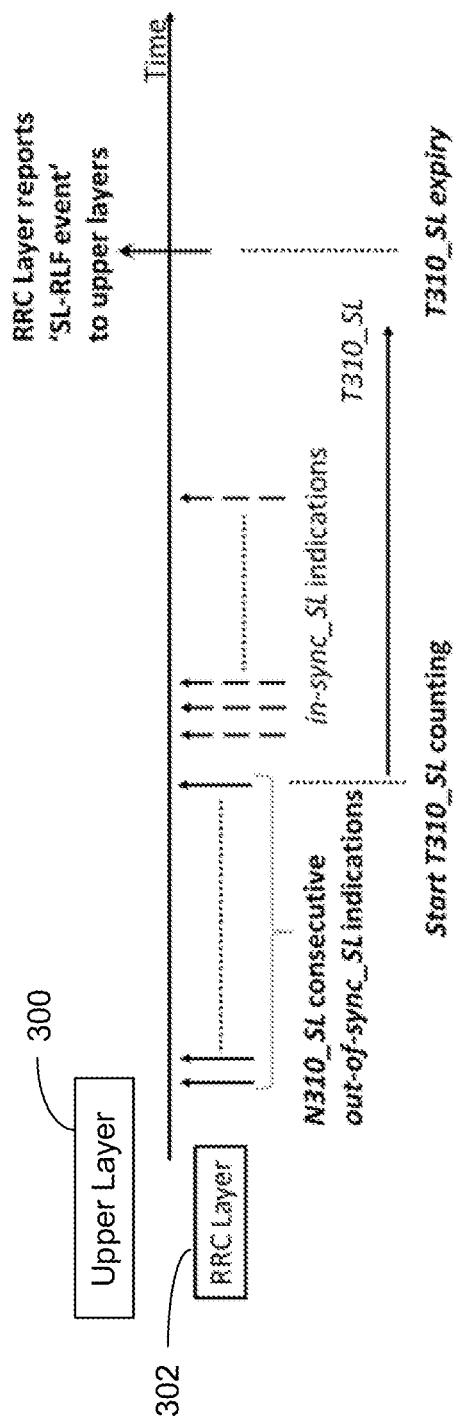
FIG. 3 is a schematic diagram illustrating an SL RLF event triggering condition, according to an implementation of the present disclosure.

FIG. 3 is a schematic diagram illustrating an SL RLF event triggering condition, according to an implementation of the present disclosure. The AS layer (e.g., the RRC entity in the PC5 interface) may report an "SL-RLF event" to the upper layer 300 (e.g., V2X layer) after the new proposed timer, T310_SL, expires.

In the PC5 interface, the UE in one SL-unicast group may count an SL timer, T310_SL, to zero respectively when the UE detects PHY layer related problems in the PC5 interface (e.g., when the UE receives N310_SL consecutive out-of-sync_SL indications, which may happen periodically or in-periodically in time domain, from the lower layer (such as the PHY layer) when both of the UEs are having a PC5 RRC connection with each other in the AS layer. In some implementations, each PC5 RRC connection may be configured with one T310_SL. In addition, the counting of out-of-sync_SL/in-sync_SL indications and running T310_SL operation in each active PC5 RRC connection of one UE may be operated independently.

The UE (e.g., via the RRC layer 302) may stop the T310_SL when the UE receives the number of indications (e.g., N311_SL consecutive in-sync_SL indications), which may be provided periodically or in-periodically in a time domain, from the PHY layer.

In addition, if the upper layer 300 (e.g., RRC entity) does not receive up to N311_SL consecutive in-sync_SL indications before the T310_SL expires, the RRC layer 302 may stop the T310_SL. After the T310_SL expires, the UE may release the PC5 RRC connection with the paired UE and then inform the released condition to the upper layer (e.g., the RRC layer or the V2X application layer in the UE).

Based on the SL RLF event triggering (or called SL-RLF procedure) mentioned above, the latency about when the upper layer receives the SL RLF indication (corresponding to a concerned SL component carrier) depends on the values in {N311_SL, N310_SL, T310_SL}. Moreover, SL RLF may cause interruption to the active V2X service(s). In the higher layer, PC5-S protocols may need to initiate a recovery procedure in the PC5-S protocols (e.g., PC5-S recovery procedure) to recover the interrupted PC5-S connection. The PC5-S recovery procedure may be initiated after the SL-RLF procedure is triggered. In addition, in a view of service, different V2X services may have different requirements for the latency of service interruption. Therefore, different values to any combinations SL-RLF combinations (e.g., {N311_SL, N310_SL, T310_SL}) may be provided to each PC5 RRC connection independently, as shown in Table 1. In some implementations, only one active SL component carrier (SL CC) in the SL-unicast group (e.g., all of the configured PC5 RRC connections may share the same SL CC). The UE (e.g., transmitting (Tx) UE in the SL-unicast group) may monitor and calculate the in-sync_SL/out-of-sync_SL indicators on the operating SL CC for each PC5 RRC connection independently. In this case, based on the same in-sync_SL/out-of-sync_SL indicators transmitted from the lower layer, different PC5 RRC connections may be reported with the SL-RLF event (e.g., by the RRC entity) at different times. For example, the V2X services (e.g., associated with one PC5-S connection) that are sensitive to service interruption may receive SL RLF report from the lower layer. In addition, the PC5-S recovery procedure may be initiated rapidly since the PC5-S interface may start the PC5-S recovery procedure earlier because of a strict SL RLF configuration (e.g., a small N310_SL value, small T310_SL value, and/or large N311_SL value or other combinations that the UE starts the T310_SL earlier and reports the SL RLF event to the higher layer sooner). In contrast, for the V2X services (e.g., associated with one PC5-S connection) that are not sensitive to service interruption, a loose SL RLF configuration (e.g., a large N310_SL value, large T310_SL value, and small N311_SL value or other combinations that the UE starts the T310_SL earlier and reports the SL RLF event to the higher layer later).

In some implementations, one SL RLF configuration (e.g., {N311_SL, N310_SL, T310_SL}) may be applied to the SL CC in a single SL CC scenario (e.g., the SL-unicast group is operating on a single SL CC) or all of the PC5 RRC connections in one SL-unicast group. Thus, the SL RLF event may be reported to all of the PC5 RRC connections in the SL-unicast group simultaneously. Table 1 includes different SL RLF configurations associated with PC5 RRC connections.

TABLE 1

| PC5 RRC connection | Associated SL RLF configuration |
| --- | --- |
| PC5-RRC Connection#1 | {T310_SL#1, N310_SL#1, N311_SL#1} |
| PC5-RRC Connection#2 | {T310_SL#2, N310_SL#2, N311_SL#2} |

In some implementations, the periodicity and the density (e.g., in a time domain) of the in-sync_SL indication/out-of-sync_SL indication that the RRC layer receives from the PHY layer may be varied based on an SL packet traffic model (e.g., the traffic patterns about an SL packet arrival time from the upper layer to the Layer 2 (e.g., Service Data Application Protocol (SDAP) layer or Packet Data Convergence Protocol (PDCP) layer in the NR/LTE PC5 interface)) of the V2X services in one PC5 RRC connection. In this case, values of the SL RLF configuration (e.g., {T310_SL #1, N310_SL #1, N311_SL #1} and MaxRetxThreshold) may be provided based on different traffic patterns in the PC5 RRC connection (e.g., when different PC5 RRC connections are associated with different SL CCs).

It is noted that for an upper layer (e.g., the RRC entity or MAC entity in the PC5 interface), the reception/recording of in-sync/out-of-sync indications and the counting timers (e.g., T310, T311) in the (LTE/NR) Uu interface and the reception/recording of in-sync_SL/out-of-sync_SL indications and the counting timers (e.g., T310_SL) associated with the configured PC5 RRC connection in (LTE/NR) PC5 interface may be achieved in the same upper layer. In addition, when the upper layer declares that RLF occurs on the (LTE/NR) Uu interface, the upper layer may keep receiving and recording the in-sync_SL/out-of-sync_SL indications and counting the timers (e.g., T310_SL) associated with each of PC5 RRC connections. Thus, the SL RLF event on the LTE/NR PC5 interface may not be impacted by the RLF event occurs on the Uu interface. In contrast, the RLF event on the LTE/NR Uu interface may not be impacted by the SL RLF event occurs on the LTE/NR PC5 interface. In some other implementations, different RRC entities (or different MAC entities) may be configured in the PC5 interface and Uu interface respectively. Then, the SL RLF event on the LTE/NR PC5 interface may not be impacted by the RLF event occurs on the Uu interface.

Furthermore, the RLF procedure in the (LTE/NR) Uu interface and the SL-RLF procedure in the PC5 interface may overlap in a time domain. In such case, one of the procedures (e.g., either SL-RLF procedure or RLF procedure) may be prioritized for the RRC entity of the UE to proceed. The RRC entity may perform the procedure with higher priority firstly and the procedure with lower priority may be postponed (e.g., the SL-RLF procedure may be performed after the RLF procedure is successfully performed on the Uu interface). In some of the implementations, the prioritization of the SL-RLF procedure and RLF procedure may be pre-defined in the technical specification (e.g., the RLF procedure always has a higher priority than the SL-RLF procedure) or pre-configured in SL pre-configuration. In some other implementations, the prioritization may be configured by a serving cell.

Implementation 2: SL RLF in SL Carrier Aggregation

Figure 4:
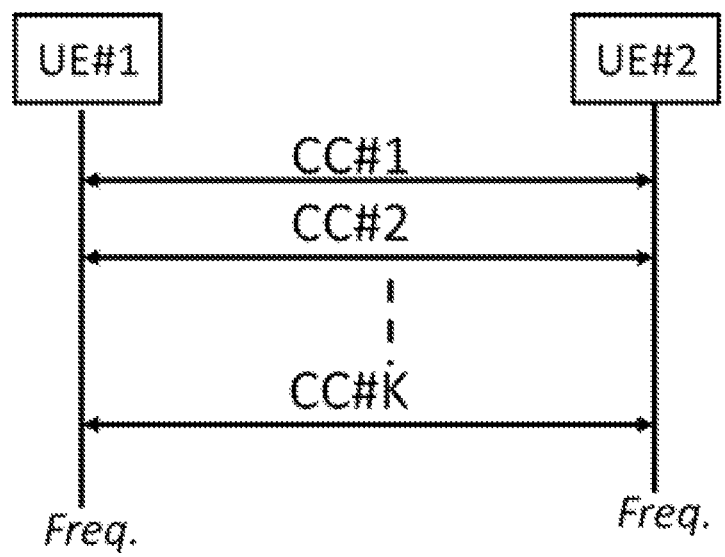
FIG. 4 is a schematic diagram illustrating an SL-unicast in multiple component carriers on PC5 interface, according to an implementation of the present disclosure.

FIG. 4 is a schematic diagram illustrating an SL-unicast in multiple-carrier on the PC5 interface, according to an implementation of the present disclosure. In this case, SL carrier aggregation is supported in the SL-unicast group. As illustrated in FIG. 4, both of the paired UEs (e.g., the UE #1 and the UE #2) may be configured with one or more component carriers (e.g., CC #1-CC #K) for the SL-unicast service between the UE #1 and the UE #2. Within the paired UEs, the SL-unicast group may obtain one (or more than one) carrier configuration through the SL pre-configuration.

In some implementations, the SL-unicast group may obtain the SL CC configuration that configures component carriers CC #1-CC #K, through a control signaling (e.g., a dedicated RRC signaling or broadcasting system information from a serving cell(s) through the Uu interface).

In some implementations, the SL-unicast group may exchange a control signaling (e.g., the paired UEs may exchange UE capability on supporting frequency carriers or SL Reference Symbol Received Power (RSRP)/Channel Busy Ratio (CBR) measurement results through a PC5 RRC signaling) to determine multiple SL CC configurations.

In addition, for each configured SL CC, the UE may be configured with one specific T310_SL (e.g., T310_SL #C1, T310_SL #C2, . . . T310_SL #CK may be configured for each SL component carrier (e.g., CC #1, CC #2, . . . CC #K) respectively in each UE). Thus, the UE may identify that an SL radio link problem happens to one SL component carrier when the corresponding T310_SL expires (e.g., CC #K has SL radio link problem when the associated T310_SL #CK expires).

In addition, each PC5 RRC connection (or the one-to-one mapped PC5-S connection) may be associated with one or more SL component carrier in the air link. Therefore, when the PC5 RRC connection is associated with only one SL CC, the RRC entity may determine that an SL RLF occurs on the PC5 RRC connection if the T310_SL of the SL CC expires. In one example, the PC5-RRC Connection #1 in FIG. 2 may be associated with {CC #1, CC #2, CC #3} in FIG. 4 and the PC5-RRC Connection #2 in FIG. 2 may be associated with {CC #2, CC #3, CC #K}. Thus, some pending SL packets in the PC5-RRC Connection #1 may be transmitted by accessing the SL resource, which includes dynamic SL grant(s), (Type 1/Type 2) configured SL grant(s), SL resource pool(s) and SL exceptional resource pool(s)) in the corresponding SL CC(s). In contrast, some pending SL packets may not be transmitted through SL resource in SL CCs that is not associated with the PC5 RRC connection. In this case, each SL CC may be associated with one SL RLF configuration (e.g., {T310_SL #1, N310_SL #1, N311_SL #1}) independently. Thus, the lower layer may indicate the in-sync_SL/out-of-sync_SL indications associated with the SL CC to the MAC layer of the UE independently. In addition, the upper layer (e.g. RRC/MAC entity) may configure and maintain the T310_SL associated with each configured SL CC independently.

In some implementations, one SL RLF configurations may be associated with a subset of SL CCs. For example, one SL RLF configuration (e.g., {N311_SL, N310_SL, T310_SL}) may be provided to SL CCs located in Frequency Range 1 (FR1) and another different SL RLF configurations may be provided to SL CCs located in FR2 (no matter whether these SL CCs are configured in the same PC5 RRC connection or not). In some implementations, different SL RLF configurations may be provided to different PC5 RRC connections, and SL CC(s) in one PC5 RRC connection may share the same SL RLF configuration.

In some implementations, SL RLF configurations may be associated with a subset of SL CCs in one PC5 RRC connection. For example, in the PC5-RRC Connection #1 in FIG. 2, which is associated with {CC #1, CC #2, CC #3} in FIG. 4, only one SL RLF configuration is provided to the CC #1 (no SL RLF configuration is provided to the CC #2 and CC #3). The lower layer may report in-sync_SL/out-of-sync_SL indications only associated with the CC #1. In addition, the RRC entity may only configure and maintain the T310_SL associated with the CC #1 (e.g., T310_CC1). Thus, the RRC entity may report that the SL RLF event occurs on the PC5 RRC connection when the T310_CC1 expires.

In some implementations, two SL RLF configurations may be configured to the CC #1 and CC #2 respectively and the upper layer (e.g., RRC/MAC entity) may be configured to maintain two T310_SL timers (e.g., T310_CC1 and T310_CC2 for the CC #1 and CC #2 respectively) to monitor the SL RLF event on the PC5 RRC connection. Therefore, the RRC entity may determine whether SL RLF event occurs on one PC5 RRC connection according to the configured T310_SL(s) in the PC5 RRC connection.

In some implementations, some PC5 RRC connections may be configured with SL RLF configuration (e.g., {N311_SL, N310_SL, T310_SL}) but (at least) one PC5 RRC connection (and the SL CC(s) associated with the PC5 RRC connection) may not be configured with the SL RLF configuration. Thus, no T310_SL timer may be configured and maintained in the PC5 RRC connection.

In some implementations, one PC5 RRC connection (e.g., PC5-RRC Connection #1 that is associated with {CC #1, CC #2, CC #3}) may only be associated with one T310_SL (e.g., T310_PC5 #1). However, the lower layer may provide in-sync_SL/out-of-sync_SL indications to the upper layer by jointly considering all (or a subset) of associated SL CC(s) in the PC5 RRC connection. Then, the RRC entity may determine whether SL RLF occurs on the PC5 RRC connection according to the counting of the T310_PC5 #1.

In some implementations, the UE may inform the upper layer that SL RLF occurs on a PC5-S connection (e.g., the RRC-S Connection #1) only if all of the configured T310_SL(s) (one T310_SL may be uniquely associated with one SL CC in one PC5 RRC connection or one T310_SL is associated with the whole PC5 RRC connection) expires.

In some implementations, the UE may inform the upper layer that SL RLF occurs on a PC5-S connection (e.g., the RRC-S Connection #1) when a subset of T310_SL(s) associated with one or more PC5 RRC connections associated with the PC5-S connection expires. For example, in the PC5-RRC Connection #1, the CC #1 and CC #2 is located on FR1 that covers the frequency bands≤7 GHz, and CC #3 is located on FR2 that covers the frequency bands>7 GHz.

In some implementations, the RRC layer of UE #1 may inform the upper layer that SL RLF events occur on the PC5 RRC connection after the T310_SL #C1, and/or T310_SL #C2 expire (T310_SL #C3 may be still running or T310_SL #C3 is not configured at all). This mechanism may be provided when the SL-unicast group depends on SL CCs in FR1. (e.g., the CC #1 and CC #2 in FIG. 4) transmits assistance information (e.g., SL beamforming information or Channel Status Information Reference Signal (CSI-RS) report) about SL operation in FR2 (e.g., CC #3) to the paired UE. In this case, the UE may inform the upper layer that SL RLF event occurs on a PC5 RRC connection if, in the concerned PC5 RRC connection, all the T310_SL(s) associated with the SL carrier(s) on FR1 expired. It is noted that the PHY layer related problem happens in FR1 may also influence the SL operation in FR2.

In some implementations, one or more primary SL CC(s) may be configured (with associated T310_SL(s) to each primary SL CC or one T310_SL associated with all primary SL CC(s)) to one PC5 RRC connection. Thus, for this PC5 RRC connection, the upper layer (e.g., RRC entity) may determine the SL RLF event occurs on this PC5 RRC connection after the T310_SL(s) of the primary SL CC expires (without considering other running or stopped T310_SL(s) in the PC5 RRC connection if there is any). In some additional implementations, in one PC5 RRC connection, the received SL-RLF configurations may only be applied to primary SL CC. In other words, the UE may not monitor whether SL RLF event happens to other non-primary SL CC(s).

Based on SL carrier aggregation mentioned above, one SL CC may be configured with one or more PC5 RRC connections. In some implementations, for one SL component carrier, there may be more than one T310_SL and each T310_SL may be associated with an active PC5 RRC connection, as shown in Table 2. The Layer 2 (e.g., the RRC layer in the PC5 interface) in each UE may maintain different T310_SL for the associated PC5 RRC connection(s). Table 2 includes SL CC configured with T310_SL(s). As shown in Table 2, each T310_SL is associated with an active PC5 RRC connection mapped to one SL CC.

TABLE 2

| PC5 RRC connection | SL CC | Associated SL RLC configuration |
|---|---|---|
| PC5-RRC Connection#1 | CC#1 | T310_SL#C1P1 |
| | CC#2 | T310_SL#C2P1 |
| | CC#3 | T310_SL#C3P1 |
| PC5-RRC Connection#2 | CC#2 | T310_SL#C2P2 |
| | CC#3 | T310_SL#C3P2 |
| | CC#K | T310_SL#CKP2 |

Implementation 3: FR-Based SL RLF Configuration

In some implementations, the values of (or any combination) SL RLF configuration (e.g., {N311_SL, N310_SL, T310_SL}) may be different based on the frequency range of the SL component carriers. For example, the SL CCs (e.g., {CC #1, CC #2}) is located on FR1 and SL CCs (e.g., {CC #3, CC #K}) is located on FR2. Thus, two sets of {T310_SL #FR1, N310_SL #FR1, N311_SL #FR1} and {T310_SL #FR2, N310_SL #FR2, N311_SL #FR2} may be applied to the SL component carriers in FR1 and FR2 respectively, as shown in Table 3. Table 3 includes FR based SL RLF configuration.

TABLE 3

| PC5 RRC connection | SL CC | Associated SL RLF configuration |
|---|---|---|
| PC5-RRC Connection#1 | CC#1 | {T310_SL#FR1, N310_SL#FR1, N311_SL#FR1} |
| | CC#2 | |
| | CC#3 | {T310_SL#FR2, N310_SL#FR2, N311_SL#FR2} |
| PC5-RRC Connection#2 | CC#2 | {T310_SL#FR1, N310_SL#FR1, N311_SL#FR1} |
| | CC#3 | |
| | CC#K | {T310_SL#FR2, N310_SL#FR2, N311_SL#FR2} |

Implementation 4: Range-Based SL RLF Configuration

Figure 5:
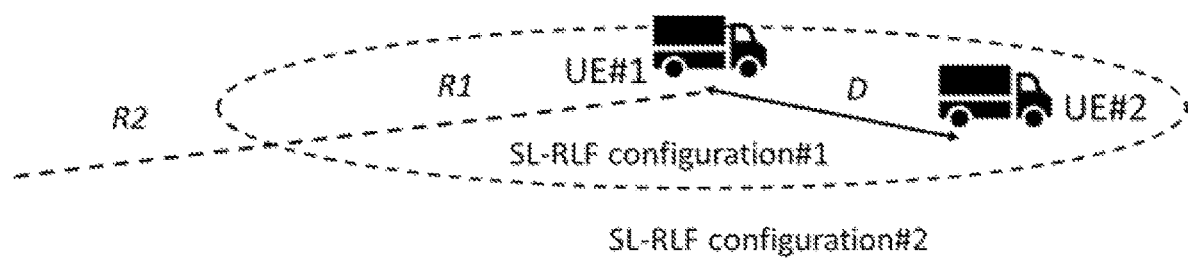
FIG. 5 is a schematic diagram illustrating SL RLF configurations associated with a distance between paired UEs, according to an implementation of the present disclosure.

FIG. 5 is a schematic diagram illustrating SL RLF configurations associated with a distance between a paired UEs, according to an implementation of the present disclosure. As illustrated in FIG. 5, the UEs in one SL-unicast group may apply different SL RLF configurations based on their distance between each other.

In this case, a range-based SL RLF configuration is disclosed. Firstly, the SL-unicast group (including the UE #1 and the UE #2) may be configured with SL RLF configurations. In a word, the SL-unicast group is configured with the SL-RLF configuration #1 and SL-RLF configuration #2, the UEs in the SL-unicast group may determine to apply which SL RLF configuration according to the communication distance between each other (e.g., 'D' shown in FIG. 5). In one implementation, one UE may transmit its location information in the PC5 interface (e.g., through the dedicated control signaling, such as SCI or SL packets that includes location information). Therefore, one UE (e.g., the UE #2 in FIG. 5) may estimate the physical distance with the other UE (e.g., the UE #1) by receiving the SCI transmitted by the UE

1. In some implementations, one UE may estimate the physical distance with the other UE through other radio access technologies, such as the NR positioning technique or Global Navigation Satellite System (GNSS) information exchange.

Moreover, as illustrated in FIG. 5, two SL RLF configurations are configured to the UE #1 and UE #2. The SL-RLF configuration #1 and SL-RLF configuration #2 are associated with (or any combination of) different SL RLF configurations, T310._SL #R1, N310_SL #R1, N311_SL #R11 and {T310_SL #R2, N310_SL #R2, N311_SL #R2} respectively, as shown in Table 4. Table 4 includes FR based SL RLF configuration.

TABLE 4

| SL RLF configuration | Associated SL RLF configuration |
|---|---|
| SL RLF configuration #1 (the UE may apply SL RLF configuration #1 while the paired UE is located in R1 (e.g., D ≤ R)) | {T310_SL#R1, N310_SL#R1, N311_SL#R1} |
| SL RLF configuration #2 (the UE may apply SL RLF configuration #2 while the paired UE is located in R2 (D > R)) | {T310_SL#R2, N310_SL#R2, N311_SL#R2} |

Based on the distance between the UE #1 and UE #2, the paired UEs may determine which SL RLF configuration to apply. For example, one UE (e.g., the UE #1 in FIG. 4) may monitor SL RLF event on (at least one) operating SL component carrier according to the SL-RLF configuration #1 when the distance between the UE #1 to the paired UE (e.g., the UE #2) is smaller than a pre-defined threshold, R (e.g., D<R). In contrast, the UE #1 may monitor SL RLF event on (at least one) operating SL component carrier according to the SL-RLF configuration #2 when the distance between the UE #1 and the UE #2 is larger than the pre-defined threshold, R (e.g., D>R). In a word, the SL-RLF configuration #1 is valid to the UE #1 if the paired UE is located in the area R1 (e.g., a circle with radius=R) and the SL-RLF configuration #2 is valid in the area R2 (e.g., the area out of R1). Similarly, the UE #2 may determine which SL RLF configuration to be applied based on the same rules. It is noted that the range-based SL RLF configuration may be applied to each SL component carrier independently when different SL RLF configurations are applied to each SL component carrier respectively, as shown in Table 4-1. In this case, the value of R (e.g., in a unit of meters) is a part of the SL RLF configuration. In other words, the SL RLF configuration includes an SL RLF control parameter (e.g., the pre-defined threshold R) for indicating a transmission range. Table 4-1 includes FR-based SL RLF configurations.

TABLE 4-1

| SL RLF configuration | SL CC | Associated SL RLF configuration |
|---|---|---|
| SL RLF configuration #1 (the UE may apply SL RLF configuration#1 while the paired UE is located in R1 (D ≤ R)) | CC#1 | {T310_SL#CC1R1, N310_SL#CC1R1, N311_SL#CC1R1} |
| | CC#2 | {T310_SL#CC2R1, N310_SL#CC2R1, N311_SL#CC2R1} |
| | CC#3 | {T310_SL#CC3R1, N310_SL#CC3R1, N311_SL#CC3R1} |
| SL RLF configuration #2 (the UE may apply | CC#1 | {T310_SL#CC1R1, N310_SL#CC1R1, N311_SL#CC1R1} |
| SL RLF configuration #2 while the paired UE is located in R2 (D > R)) | CC#2 | {T310_SL#CC2R1, N310_SL#CC2R1, N311_SL#CC2R1} |
| | CC#3 | {T310_SL#CC3R1, N310_SL#CC3R1, N311_SL#CC3R1} |

Implementation 5: maxRetxThreshold

In the PC5 RRC connection, the criteria of maximum number of (ARQ) Re-transmission (maxRetxThreshold_SL) (e.g., the maximum number of SL packet re-transmission threshold as mentioned above) is one rule for the Layer 2 of the UE to initiate SL RLF report to the upper layer when the number of retransmitted SL Radio Link Control Packet Data Unit (SL-RLC PDU) (e.g., an SL RLC PDU in Acknowledgement (AM) mode) is transmitted up to 'maxRetxThreshold_SL'.

In a case of SL RLC AM, an RLF indication is triggered when the maximum number of retransmissions has been reached. In the PC5 interface, the RLC entity of one SL radio bearer that may include SL Signal Radio Bearer (SL-SRB), and SL Data Radio Bearer (SL-DRB) may indicate to the upper layer (e.g., the RRC layer in the PC5 interface) that the maximum number of retransmissions has been reached. Then, the Layer 2 of the UE may inform SL RLF event to the upper layer (e.g., V2X layer). It is noted that each PC5 RRC connection may be associated with one SL-SRB and (at least) one SL-DRB. In some implementations, one PC5 RRC connection may only be associated with one SL-SRB and no SL-DRB is configured in this PC5 RRC connection.

The 'maxRetxThreshold_SL' may be included in the SL RLF configuration. In addition, the 'maxRetxThreshold_SL' may be associated with the transmission range (as above-mentioned, the SL RLF configuration also includes the SL RLF control parameter for indicating a transmission range). Thus, the UE may select the 'maxRetxThreshold_SL' associated with one PC5 RRC connection according to the communication distance 'D' and the transmission range. Moreover, the UE may determine an SL RLF event occurs on the PC5 RRC connection when the number of SL packet (e.g., SL-RLC PDU) retransmissions in the PC5 RRC connection is reached to (or above) the selected 'maxRetxThreshold_SL'.

In some implementation, a 'maxDTXThreshold_SL' threshold may be applied to reflect the sidelink radio failure event when Sidelink Hybrid Automatic Repeat reQuest (SL-HARQ) transmission protocols is applied by one Tx UE to one target Rx UE. For example, the MAC entity of one (Tx) UE may receive consecutive/inconsecutive SL-HARQ Discontinuous Transmission (DTX) indications from the lower layer (e.g., PHY layer) when the UE keeps HARQ-encoded packets (re)transmission to the target Rx UE. In some conditions, the HARQ DTX indication means that the Tx UE does not receive any response (e.g., neither HARQ ACK/NACK message for each sidelink packet (re)transmission from the Tx UE) from the associated Rx UE. In addition, the Tx UE (e.g., the MAC entity) may receive as many as N consecutive HARQ DTX indications from the lower layer (e.g., the PHY layer). In addition, the MAC entity may transmit one indicator (e.g., an SL-RLF indicator) to the RRC entity when the value of N reaches up to (or above) a pre-defined upper bound of consecutive HARQ DTX receptions to the same destination (e.g., a threshold of the maximum number of consecutive SL-HARQ DTX to the Rx UE for SL-RLF decision). After receiving the SL-RLF indicator from the MAC entity, the RRC entity may determine SL-RLF (associated with the Rx UE) event happens. Then, the (Tx) UE may transmit the SL-RLF report to its serving cell and/or other procedures disclosed in the presented application. It is noted that, to one destination ID (e.g., the destination ID of the Rx UE), the Tx UE may calculate the SL-HARQ Discontinuous Transmission (DTX) indications to the same destination ID jointly (e.g., the SL-HARQ DTX indications of different SL radio bearers with the same PC5-RRC connection) for SL-RLF event determination of the associated Rx UE.

It is noted that, in some implementations, different values of "maximum number of consecutive SL-HARQ DTX threshold" associated with different mobility state may be configured to the Tx UE. For example, three values: 'maxDTXThresholdSL_LowMobility'/'maxDTXThresholdSL_MediumMobility'/'maxDTXThresholdSL_HighMobility' may be configured to the UE to apply when the UE is under low mobility state/medium mobility state/high mobility state respectively. Then, the Tx UE may determine which threshold(s) to apply based on the current mobility state. In some implementations, the mobility state may be determined based on absolute speed of the Tx UE or the respective speed between the paired Tx/Rx UE. In other implementations, different values of "maxRetxThreshold_SL" associated with different mobility state may be configured to the Tx UE. For example, three values: 'maxRetxThresholdSL_LowMobility'/'maxRetxThresholdSL_MediumMobility'/'maxRetxThresholdSL_HighMobility' may be configured to the UE to apply when the UE is under low mobility state/medium mobility state/high mobility state respectively. Then, the Tx UE may determine which thresholds to apply based on the current mobility state of itself. In some implementations, the mobility state may be determined based on absolute speed of the Tx UE or the respective speed between the paired Tx/Rx UE. In some additional implementations, the UE may determine the mobility state based on other radio access technologies (e.g., GNSS).

It is noted that, in some implementations, the counting procedure (e.g., the UE is counting the number of SL ARQ re-transmission or the UE is counting the number of SL HARQ DRX indications) associated with the PC5 RRC connection may not be interrupted when the UE changes the threshold based on its mobility state. In addition, the stored value(s) of the number of SL ARQ re-transmission number and/or the number of (continuous) SL HARQ DTX indications may not be reset when the (Tx) UE changes the SL-RLF configuration based on its mobility state. In contrast, in some implementations, the counting procedure (e.g., the UE is counting the number of SL ARQ re-transmission or the UE is counting the number of SL HARQ DRX indications) associated with PC5 RRC connection may be interrupted when the (Tx) UE changes the SL RLF configuration based on its mobility state. In addition, the stored values(s) of SL ARQ re-transmission number and/or the number of (continuous) SL HARQ DTX indications may be reset when the (Tx) UE changes the SL-RLF configuration based on its mobility state.

In some implementations, the maxDTXThreshold_SL may be associated with the transmission range (as above-mentioned, the SL RLF configuration also includes the SL RLF control parameter for indicating a transmission range). Thus, the UE may select the 'maxDTXThreshold_SL' associated with one PC5 RRC connection according to the communication distance 'D' and the transmission range. Moreover, the UE may determine an SL RLF event occurs on the PC5 RRC connection when the number of SL packet (e.g., SL-RLC PDU) retransmissions in the PC5 RRC connection is reached to (or above) the selected 'maxDTXThreshold_SL'. In other implementations, the maxRetxThreshold_SL may be associated with the transmission range (as above-mentioned, the SL RLF configuration also includes the SL RLF control parameter for indicating a transmission range). Thus, the UE may select the 'maxRetxThreshold_SL' associated with one PC5 RRC connection according to the communication distance 'D' and the transmission range. Moreover, the UE may determine an SL RLF event occurs on the PC5 RRC connection when the number of SL packet (e.g., SL-RLC PDU) retransmissions in the PC5 RRC connection is reached to (or above) the selected 'maxRetxThreshold_SL'.

It is noted that, the proposed parameters for SL RLF configuration may be associated with a given mobility threshold. For example, the UE may be configured SL RLF configuration (e.g., maxRetxThreshold_SL and/or maxDTXThreshold_SL) with one (or more) UE speed threshold (e.g., UESpeedThreshold=kmph60), which means the SL RLF configuration is applicable when the UE speed is lower (and/or equivalent to) 60 kilometers per hour). Except Kmph60, other parameters, such as Kmph80, Kmph160, etc, may also be configured to the UE with the SL RLF configuration. So, the mobility threshold may also be included as part of the SL RLF configuration.

It is noted that, in some implementations, the counting procedure (e.g., the UE is counting the number of SL ARQ re-transmission or the UE is counting the number of SL HARQ DRX indications) associated with the PC5 RRC connection may not be interrupted when the UE changes the threshold based on its communication distance 'D' and the transmission range associated with the SL RLF configuration. In addition, the stored value(s) of the number of SL ARQ re-transmission number and/or the number of (continuous) SL HARQ DTX indications may not be reset when the (Tx) UE changes the SL-RLF configuration based on its communication distance 'D' and the transmission range associated with the SL RLF configuration. In contrast, in some implementations, the counting procedure (e.g., the UE is counting the number of SL ARQ re-transmission or the UE is counting the number of SL HARQ DRX indications) associated with one PC5 RRC connection may be interrupted when the (Tx) UE changes the SL RLF configuration based on its communication distance 'D' and the transmission range associated with the SL RLF configuration. In addition, the stored value(s) of SL ARQ re-transmission number and/or the number of (continuous) SL HARQ DTX indications may be reset when the (Tx) UE changes the SL-RLF configuration (e.g., based on its mobility state).

In some implementations, one RRC entity may be in charge of the SL RLF event in the LTE/NR PC5 interface and the RLF event in the LTE/NR Uu interface. Thus, the RRC entity may receive RLC indication from the RLC entity associated with one radio bearer of the LTE/NR Uu interface or the LTE/NR PC5 interface. After the RRC entity receives the RLC indication that indicates that the maximum number of retransmissions has been reached, from the RLC entity, the RRC entity may determine whether the RRC entity needs to initiate the SL-RLF procedure in the PC5 interface (e.g., the RLC indication received from an SL radio bearer(s) in the PC5 interface) and/or whether the RRC entity needs to initiate the RLF procedure in the Uu interface (e.g., the RLC indication received from radio bearers in the Uu interface) based on the RLC indication is transmitted by which RLC bearer (e.g., DRB/SRB in the Uu interface or SL-DRB/SL-SRB in the PC5 interface). On the other hand, the RRC entity may initiate the RLF procedure in the Uu interface if (at least) one RLC indication is transmitted from the RLC entity of DRB(s)/SRB(s) in the Uu interface. The RRC entity may initiate the SL-RLF procedure in the PC5 interface (e.g., one PC5 RRC connection) if (at least) one RLC indication is transmitted from the RLC entity of SL-DRB(s)/SL-SRB(s) in the PC5 RRC connection. Table 5 illustrates 'maxRetxThreshold_SL' for PC5 RRC connection.

TABLE 5

| Approach | Mechanisms |
| --- | --- |
| PC5 RRC connection (also PC5-S connection) based | Each PC5 RRC connection may be associated with different values in maxRetxThreshold_SL/maxDTXThreshold_SL. For example, the PC5-RRC Connection#1 may be associated with maxRetxThreshold_SL#1 and the PC5-RRC Connection#2 may be associated with maxRetxThreshold_SL#2.<br>In addition, the associated maxRetxThreshold_SL/maxDTXThreshold_SL value in one PC5 RRC connection may be provided to all of the SL-DRBs and/or all of the SL-SRBs in the PC5 RRC connection. |
| SL Radio Bearer based | In one PC5-S connection, each SL radio bearer that includes SL-DRB and SL-SRB in the RLC AM mode may be associated with a different maxRetxThreshold_SL/maxDTXThreshold_SL value. |
| UE-specific based | One UE may appoint one maxRetxThreshold_SL/maxDTXThreshold_SL value to all of the SL-RB(s) (in all of the active SL PC5 RRC connection) in the UE.<br>The UE-specific approach may be applied to other parts of SL RLF configuration. |
| Range-based | By referring to FIG. 4, different values {maxRetxThreshold_SL#R1, maxRetxThreshold_SL#R2} or {maxDTXThreshold_SL#R1, maxDTXThreshold_SL#R2} may be configured<br>(For example, maxRetxThreshold_SL#R1 may be smaller than maxRetxThreshold_SL#R2 since UEs in shorter distance may need to report the SL RLF event to the upper layer sooner (for the upper layer to initiate the PC5-S recovery procedure). In comparison, the UEs that have a larger distance between each other may wait more re-transmission times before reporting the SL RLF event to the upper layer). |

In some implementations, the mechanisms in Table 5 may be applied jointly.

Implementation 6: Transmitting Approach for SL RLF Configurations

The members in one SL-unicast group may obtain the SL RLF configuration through many approaches, which are summarized in Table 6. It is noted that the proposed transmitting approaches may be applicable to deliver all types of SL RLF configurations. Table 6 includes transmission of SL RLF configurations.

TABLE 6

| Approach | Transmission mechanism |
| --- | --- |
| Upper layer configuration | The upper layer (e.g., V2X layer) in the UE may instruct the values of SL-configuration(s) while the upper layer instructs the AS layer to establish a PC5 RRC connection. |
| Pre-defined | The values of SL RLF configuration(s) may be pre-defined in the 3GPP technical specification. |
| SL Pre-configuration | The SL RLF configuration(s) may be stored in the UMTS Subscriber Identity Module (USIM) or the memory module in the UE. |
| Serving RAN (Radio Access Network) broadcasting message (e.g., system information) | (1) The UE may obtain SL RLF configuration(s) by receiving the broadcasting system information from the serving cell.<br>(2) For a UE in the RRC Connected state, the serving cell may be a primary cell or primary secondary cell.<br>(3) In some implementations, the UE may obtain the related system information (e.g., system information to configure NR/LTE SL) through the system information-on-demand procedure.<br>(4) For a UE in the RRC_Idle/RRC_Inactive state, the serving RAN may be a cell that the UE camps on. |
| Serving RAN (Radio Access Network) delivers dedicated control signaling | In some implementations, one UE may obtain the SL RLF configuration(s) by receiving dedicated control signaling from the serving cell (e.g., a PCell or PScell).<br>The dedicated control signaling may be RRC signaling that may cover the RRC signaling in the LTE/NR Uu interface. For example, RRC(Connection)(Re)Establishment message, RRC(Connection)Setup message, RRC(Connection)Release message with/without suspend configuration, RRC(Connection)Reconfiguration message with/without mobilitycontrolinfoV2X, or |

TABLE 6-continued

| Approach | Transmission mechanism |
| --- | --- |
| | RRC(Connection)Reconfiguration message with/without reconfigurationwithsync message. In addition, the reconfigurationwithsync/mobilitycontrolinfoV2X message may be transmitted when the serving RAN instructs the UE to implement (intra-RAT/inter-RAT) handover procedure, SCG change, etc.) |
| UE delivering approach | In some implementations, one UE (e.g., the UE#1 in FIG. 2) may receive the SL RLF configuration from other UE(s), which the other UE may also be the members in the same SL-unicast group (e.g., the UE#2 in FIG. 2) or not in the same SL-unicast group (e.g., an SL group leader that manages the SL-unicast group including the UE#1 and UE#2 through a control signaling in the PC5 interface. The control signaling may include broadcasting message (e.g., MIB-SL in LTE V2X) or dedicated control signaling (e.g., PC5 RRC signaling, SCI, or SL packets transmitted through Physical Sidelink Shared Channel (PSSCH)). |

Default SL RLF configuration: In some implementations, the UE may store one SL RLF configuration (e.g., the SL RLF configuration in SL-pre-configuration or through other proposed approaches above) as the default SL RLF configuration. In some implementations, the UE may be configured (e.g., by serving cell or be defined in the 3GPP technical specification) to apply the default SL RLF configuration when the UE could not find out appropriate mapping for SL RLF configuration of (at least) one active PC5 RRC connection (e.g., no associated transmission range or mobility state mapping). In other words, the default SL RLF configuration includes a lower priority in comparison with the SL RLF configurations with indicated additional control parameters (e.g., transmission range and/or mobility state). Otherwise, the UE may not implement implementations about SL RLF event on the PC5 RRC connection if there is no corresponding default SL-RLF configuration configured to the UE.

SL RLF re-configuration and update: In some implementations, based on the default SL RLF configuration, the UE may receive another SL RLF configuration (e.g., transmitted by RAN or by neighbor UE). In some implementations, the UE may release the default SL RLF configuration and apply the new SL RLF configuration directly (e.g., the UE may store the SL RLF configuration by itself). In some implementations, a delta signaling approach may be applied: the new SL RLF configuration may indicate the UE to add new parameters/remove stored parameters/replace one stored parameter by a received new parameter. Thus, the UE may generate one updated SL RLF configuration by jointly considering the stored SL RLF configuration with the newly received SL RLF configuration.

Assistance information: When different SL RLF configurations are provided to be associated with different PC5-S connections/PC5 RRC connections, each SL RLF configuration may be further associated with assistance information, such as SL QoS indicator, Priority level information, PC5-S connection identifier, Layer-2 Source ID, Layer-2 Destination ID, Identifiers provided by upper layers, SL-unicast group ID, etc. with the configured SL RLF configurations. Therefore, the UE may monitor whether SL RLF event occurs on one PC5 RRC connection (or the associated PC5-S connection) based on the associated SL RLF configuration. In some implementations, one RRC entity in the UE (e.g., TX UE) may monitor multiple PC5 RRC connections independently and justify whether SL RLF happens to (at least) one PC5 RRC connections managed by the RRC entity. In some implementations, the UE may report SL RLF of (more than) one PC5 RRC connection in one UL control signaling to the serving cell (e.g., either master node or secondary node when multi-RAT Dual-Connectivity (MR-DC) is configured in the LTE/NR Uu interface).

Implementation 7: SL RLF Reporting

In one implementation, the AS layer (e.g., RRC layer in the PC5 interface) may report the SL RLF event to the upper layer (e.g., V2X layer in the PC5 interface), so the upper layer may initiate PC5-S recovery procedure in the upper layer). In some implementations, the UE may report the "SL-RLF event" associated with (at least) one PC5 RRC connection the signaling exchange in the airlink, which may cover the LTE/NR Uu interface or the LTE/NR PC5 interface. The proposed designs are summarized in Table 7. Table 7 includes SL RLF event reporting in airlink.

TABLE 7

| Target of SL RLF report | Mechanism |
| --- | --- |
| Serving RAN (to UEs in RRC Connected state) | In some implementations, one UE (e.g., the UE#1 in FIG. 2) may report the "SL-RLF event" to the serving cell (e.g., PCell in MCG and/or PSCell in SCG) through dedicated control signaling. In some implementations, the dedicated control signaling may include UEAssistanceInformation in the (LTE/NR) Uu interface in the UL direction. In this case, the "SL-RLF event" may be further associated with assistance information, such as Layer-2 Destination (e.g., the Layer 2 ID of UE#2 in FIG. 2), etc. Based on the associated assistance information, the serving cell may identify the "SL-RLF event" happens to which SL-unicast group. |
| Serving RAN (to UEs in RRC Inactive state) | In some implementations, a UE in the RRC Inactive state may access SL configured grant or SL resource pools based on the instructions (e.g., through dedicated RRC signaling) from the serving cell. Thus, the UE may initiate the RRC Connection Resume procedure to report the "SL- |

TABLE 7-continued

| Target of SL RLF report | Mechanism |
| --- | --- |
| | RLF event" to the serving cell:<br>In some implementations, one UE (e.g., UE#1 in FIG. 2) in the RRC Inactive state may initiate the RRC Connection Resume procedure by transmitting the RRC Connection Resume Request message to the serving cell through 4-step (e.g., RRC Connection Resume Request message is transmitted in MSG3 after the UE receives the random access response message from the serving cell successfully) random access procedure or 2-step (e.g., RRC Connection Resume Request message is transmitted in MSGA with the preamble) random access procedure.<br>In some implementations, the UE may further indicate the Resume Cause = SL RLF in the RRC Connection Resume Request message. In some implementations, the UE may transmit SL RLF report to the serving cell with the RRC Connection Resume Request message directly.<br>After sending the RRC Connection Resume Request message to the serving cell, the UE may receive the RRC Connection Resume message from the serving cell. Then, the UE may transition to the RRC Connected state and report "SL-RLF event" to the serving cell after requesting UL physical resources successfully to transmit the SL RLF report to the serving cell.<br>In the SL RLF report, the UE may request to remove the Layer-2 Destination ID of the UE which "SL-RLF event" happens (e.g., UE#2 in FIG. 2) with the concerned UE (e.g., UE#1 in FIG. 2).<br>In some implementations, the UE may also report SL-measurement with the SL RLF report.<br>In some implementations, after sending the RRC Connection Resume Request message to the serving cell, the UE may receive RRC Release message with suspend configuration and stay in RRC_INACTIVE state. At this stage, the UE may determine the SL RLF report has been received by the serving cell successfully.<br>In some implementations, the RRC Inactive UE may be enabled to transmit SL RLF report to the serving cell through (Type1/Type2) configured grant on the Uu interface (e.g., the serving cell may pre-configure Type1 configured grant configuration to the UE in the RRCRelease message, which instructs the UE to move from RRC Connected state to RRC Inactive state. So, after moving to RRC Inactive state after receiving the RRCRelease message, the UE is enabled to access the Type 1 configured grant configuration to transmit small data (e.g., the SL RLF report) to the serving cell while the UE is staying in RRC Inactive state). |
| Serving RAN (to UEs in RRC Idle state) | In some implementations, a UE in an RRC Idle state may initiate the RRC Connection Establishment procedure to transmit the SL RLF report to the serving cell. For example, the UE may store the SL RLF report as part of the measurement report (e.g., Early measurement report or logged measurement report). the UE may indicate that the measurement report (e.g., SL RLF report) is available to the serving cell (e.g., while the UE is implementing the RRC Connection Establishment procedure to build the RRC connection with the serving cell). Then, the serving cell may send an Enquiry message to request the UE to transmit the (Early) measurement report. After receiving the Enquiry message, the UE would transmit the (Early) measurement report that includes SL RLF report, to the serving cell. |
| Paired UE | In some implementations, one UE (e.g., the UE#1 in FIG. 2) may report the "SL-RLF event" (associated with one PC5 RRC connection) to the paired UE (e.g., UE#2 in FIG. 2) through control signaling (e.g., through another PC-RRC connection with the same paired UE) in PC5 interface.<br>The control signaling may include dedicated control signaling (e.g., PC5 RRC signaling, SCI, or sidelink packets transmitted through Physical Sidelink Shared Channel (PSSCH)). |
| Non-Paired UEs | In some implementations, one UE (e.g., the UE#1 in FIG. 2) may report the "SL-RLF event" to another UE that is not in the same SL-unicast group (e.g., an SL group leader which manages the SL-unicast group including the UE#1 and the UE#2 through control signaling in the PC5 interface. |

TABLE 7-continued

| Target of SL RLF report | Mechanism |
|---|---|
| | The control signaling may include dedicated control signaling (e.g., PC5 RRC signaling, SCI, or sidelink packets transmitted through PSSCH). |

It should be noted that:
The SL RLF report may include the following information:
(1) The (Layer-2) Destination UE ID or (Layer-2) Destination Group ID.
(2) The (Layer-2) Source UE ID.
(3) The associated SL CC ID (e.g., absolute radio-frequency channel number (ARFCN) value).
(4) Cause of "SL-RLF event" (e.g., RLC indication or T310_SL expiry, SL-HARQ Failure (e.g., the number of consecutive SL-HARQ DTX indications reaches up to (or above) the maxDTXThreshold_SL value, etc).

Figure 6:
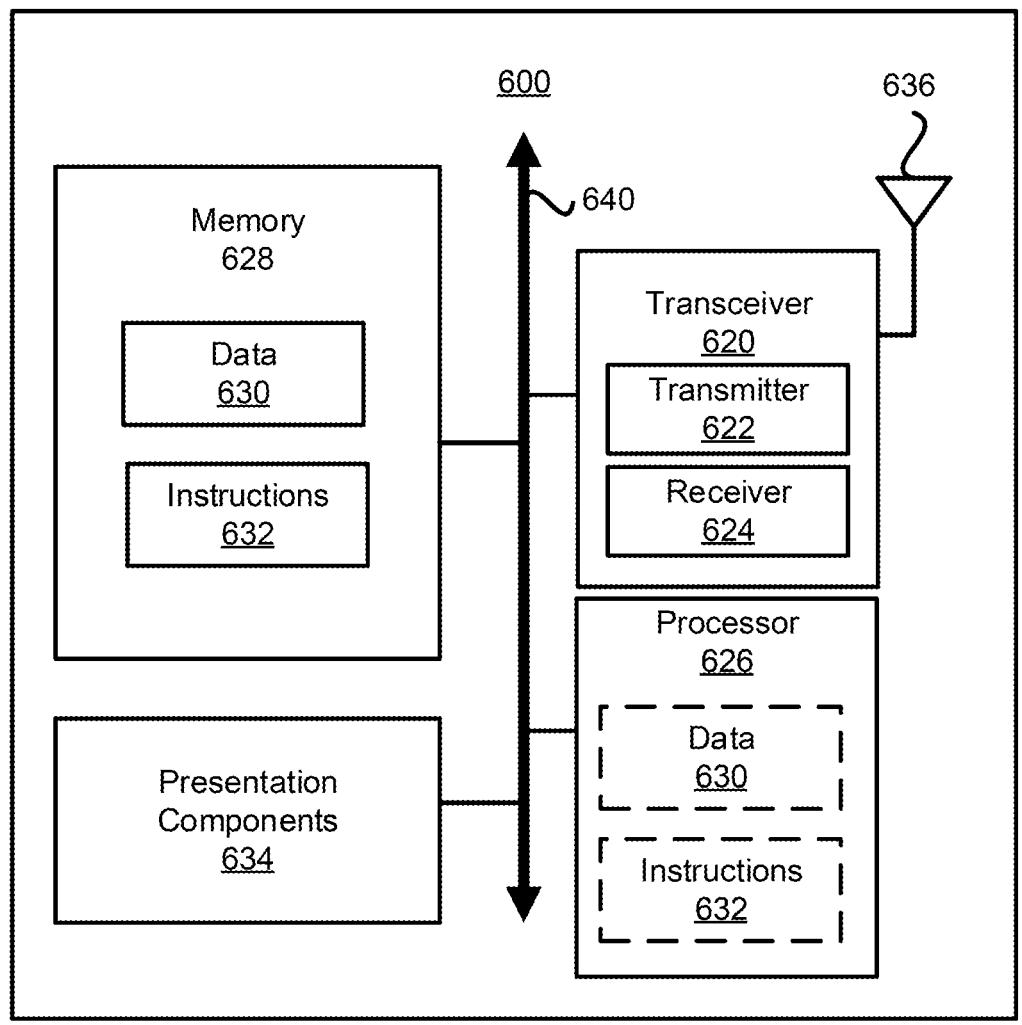
FIG. 6 is a block diagram illustrating a node for wireless communication, according to an implementation of the present disclosure.

FIG. 6 is a block diagram illustrating a node 600 for wireless communication according to an implementation of the present disclosure.

As illustrated in FIG. 6, the node 600 may include a transceiver 620, a processor 626, a memory 628, one or more presentation components 634, and at least one antenna 636. The node 600 may also include a Radio Frequency (RF) spectrum band module, a BS communications module, a network communications module, and a system communications management module, input/output (I/O) ports, I/O components, and a power supply (not illustrated in FIG. 6). Each of these components may be in communication with each other, directly or indirectly, over one or more buses 640. The node 600 may be a UE or a BS that performs various disclosed functions as illustrated in FIG. 1.

The transceiver 620 may include a transmitter 622 (with transmitting circuitry) and a receiver 624 (with receiving circuitry) and may be configured to transmit and/or receive time and/or frequency resource partitioning information. The transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media may be any media that can be accessed by the node 600 and include both volatile (and non-volatile) media, removable (and non-removable) media. Computer-readable media may include computer storage media and communication media. Computer storage media may include both volatile (and/or non-volatile), as well as removable (and/or non-removable) media implemented according to any method or technology for storage of information such as computer-readable media.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the disclosed media should be included within the scope of computer-readable media.

The memory 628 may include computer-storage media in the form of volatile and/or non-volatile memory. The memory 628 may be removable, non-removable, or a combination thereof. For example, the memory 628 may include solid-state memory, hard drives, optical-disc drives, etc. As illustrated in FIG. 6, the memory 628 may store computer-readable and/or computer-executable instructions 632 (e.g., software codes) that are configured to, when executed, cause the processor 626 (e.g., processing circuitry) to perform various disclosed functions. Alternatively, the instructions 632 may not be directly executable by the processor 626 but may be configured to cause the node 600 (e.g., when compiled and executed) to perform various disclosed functions.

The processor 626 may include an intelligent hardware device, a central processing unit (CPU), a microcontroller, an ASIC, etc. The processor 626 may include memory. The processor 626 may process the data 630 and the instructions 632 received from the memory 628, and information through the transceiver 620, the baseband communications module, and/or the network communications module. The processor 626 may also process information to be sent to the transceiver 620 for transmission via the antenna 636, to the network communications module for transmission to a CN.

One or more presentation components 634 may present data to a person or other devices. Presentation components 634 may include a display device, a speaker, a printing component, a vibrating component, etc.

From the present disclosure, it is evident that various techniques can be utilized for implementing the concepts of the present disclosure without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the particular described implementations, but that many rearrangements, modifications, and substitutions are possible without departing from the scope of the present disclosure.

What is claimed is:

1. A method of sidelink (SL) radio link failure (RLF) control for a first user equipment (UE) in communication with a second UE, the method comprising:
   obtaining at least one SL RLF configuration, wherein the SL RLF configuration is associated with at least one SL radio bearer within at least one PC5 radio resource control (RRC) connection established between the first UE and the second UE and includes at least one SL RLF control parameter indicating at least one transmission range for SL communication;

selecting, by the first UE, the at least one SL RLF control parameter of the SL RLF configuration associated with the at least one PC5 RRC connection, according to a communication distance between the first UE and the second UE and the at least one transmission range indicated by the at least one SL RLF control parameter; and determining, by the first UE, that an SL RLF event has occurred on the at least one PC5 RRC connection based on the selected SL RLF control parameter.

2. The method of claim 1, wherein:

the at least one SL RLF configuration further includes at least one maximum number of SL packet re-transmissions threshold associated with the at least one transmission range;

selecting the at least one SL RLF control parameter further comprises selecting, by the first UE, the at least one maximum number of SL packet re-transmissions threshold associated with the at least one PC5 RRC connection according to the communication distance between the first UE and the second UE and the at least one transmission range indicated by the at least one SL RLF control parameter; and determining that the SL RLF event has occurred further comprises determining, by the first UE, the SL RLF event has occurred on the at least one PC5 RRC connection in response to the number of SL packet re-transmissions associated with the at least one SL radio bearer within the PC5 RRC connection being equal to or greater than the selected at least one maximum number of SL packet re-transmissions threshold.

3. The method of claim 2, wherein the at least one maximum number of SL packet re-transmissions threshold is an SL packet re-transmissions threshold for an Automatic Repeat-reQuest (ARQ) mechanism in a Radio Link Control (RLC) entity associated with the at least one SL radio bearer within the at least one PC5 RRC connection.

4. The method of claim 2, wherein the at least one maximum number of SL packet re-transmissions threshold is a Sidelink Hybrid Automatic Repeat reQuest (SL-HARQ) packet discontinuous transmission (DTX) threshold for an SL-HARQ mechanism in a Medium Access Control (MAC) entity associated with the at least one SL radio bearer within the at least one PC5 RRC connection.

5. The method of claim 1, wherein the at least one SL RLF configuration is obtained, through a pre-installed SL pre-configuration, from a serving cell through a Uu interface, or from a third UE through a PC5 interface.

6. The method of claim 1, further comprising:
reporting, by the first UE, an SL RLF report,
wherein the SL RLF report is reported to a serving cell of the first UE with a UE identifier corresponding to the second UE.

7. The method of claim 1, further comprising:
reporting, by the first UE, an SL RLF report,
wherein the SL REF report is reported to the second UE through at least a second PC5 RRC connection between the first UE and a third UE.

8. The method of claim 1, further comprising:
estimating, by the first UE, the communication distance between the first UE and the second UE according to sidelink control information (SCI) received from the second UE.

9. A first user equipment (UE) for performing sidelink (SL) radio link failure (RLF) control, the first UE comprising:

a processor, for executing computer-executable instructions; and a non-transitory computer-readable medium, coupled to the processor, for storing the computer-executable instructions, wherein the computer-executable instructions, when executed by the processor, instruct the processor to:

obtain at least one SL RLF configuration, wherein the SL RLF configuration is associated with at least one SL radio bearer within at least one PC5 radio resource control (RRC) connection established between the first UE and a second UE and includes at least one SL RLF control parameter indicating at least one transmission range for SL communication;

select, by the first UE, the at least one SL RLF control parameter of the SL RLF configuration associated with the at least one PC5 RRC connection, according to a communication distance between the first UE and the second UE and the at least one transmission range indicated by the at least one SL RLF control parameter; and determine, by the first UE, that an SL RLF event has occurred on the at least one PC5 RRC connection based on the selected SL RLF control parameter.

10. The first UE of claim 9, wherein the at least one SL RLF configuration further includes at least one maximum number of SL packet re-transmissions threshold associated with the at least one transmission range, and wherein the computer-executable instructions, when executed by the processor, further instruct the processor to:

select, by the first UE, the at least one maximum number of SL packet re-transmissions threshold associated with the at least one PC5 RRC connection according to the communication distance between the first UE and the second UE and the at least one transmission range indicated by the at least one SL RLF control parameter; and determine, by the first UE, that the SL RLF event has occurred on the at least one PC5 RRC connection in response to a number of SL packet re-transmissions associated with the at least one SL radio bearer within the PC5 RRC connection being equal to or greater than the selected at least one maximum number of SL packet re-transmissions threshold.

11. The first UE of claim 10, wherein the at least one maximum number of SL packet re-transmissions threshold is an SL packet re-transmissions threshold for an Automatic Repeat-reQuest (ARQ) mechanism in a Radio Link Control (RLC) entity associated with the at least one SL radio bearer within the at least one PC5 RRC connection.

12. The first UE of claim 10, wherein the at least one maximum number of SL packet re-transmissions threshold is a Sidelink Hybrid Automatic Repeat reQuest (SL-HARQ) packet discontinuous transmission (DTX) threshold for an SL-HARQ mechanism in a Medium Access Control (MAC) entity associated with the at least one SL radio bearer within the at least one PC5 RRC connection.

13. The first UE of claim 9, wherein the at least one SL RLF configuration is obtained, through a pre-installed SL pre-configuration, from a serving cell through a Uu interface, or from a third UE through a PC5 interface.

14. The first UE of claim 9, wherein the computer-executable instructions further instruct the processor to:
report, by the first UE, an SL RLF report;
wherein the SL RLF report is reported to the serving cell of the first UE with a UE identifier corresponding to the second UE.

15. The first UE of claim 9, wherein the computer-executable instructions, when executed by the processor, further instruct the processor to:
- report, by the first UE, an SL RLF report,
  - wherein the SL RLF report is reported to the second UE through the at least one PC5 RRC connection between the first UE and a third UE.

16. The first UE of claim 9, wherein the computer-executable instructions, when executed by the processor, further instruct the processor to:
- estimate, by the first UE, the communication distance between the first UE and the second UE according to sidelink control information (SCI) received from the second UE.

* * * * *